United States Patent [19]

Marts et al.

[11] Patent Number: 5,470,043
[45] Date of Patent: Nov. 28, 1995

[54] MAGNETIC LATCHING SOLENOID

[75] Inventors: Donna J. Marts; John G. Richardson; Richard K. Albano; John L. Morrison, Jr., all of Idaho Falls, Id.

[73] Assignee: Lockheed Idaho Technologies Company, Idaho Falls, Id.

[21] Appl. No.: 250,208

[22] Filed: May 26, 1994

[51] Int. Cl.⁶ .................................... F16K 31/08
[52] U.S. Cl. .................. 251/65; 251/129.01; 335/234
[58] Field of Search ................. 251/65, 129.01; 335/234, 229

[56] References Cited

U.S. PATENT DOCUMENTS

| | | | |
|---|---|---|---|
| 3,040,217 | 6/1962 | Conrad | 335/234 |
| 3,368,788 | 2/1968 | Padula | 251/65 |
| 3,532,121 | 10/1970 | Sturman | 251/65 |
| 3,634,735 | 1/1972 | Komatsu | 335/234 X |
| 4,306,704 | 12/1981 | Clark | 251/137 |
| 4,683,454 | 7/1987 | Vollmer et al. | 335/299 |
| 5,010,911 | 4/1991 | Grant | 251/65 X |

*Primary Examiner*—Stephen M. Hepperle
*Attorney, Agent, or Firm*—Hopkins Roden Crockett Hansen & Hoopes; Alan D. Kirsch

[57] ABSTRACT

This invention discloses a D.C. magnetic latching solenoid that retains a moving armature in a first or second position by means of a pair of magnets, thereby having a zero-power requirement after actuation. The first or second position is selected by reversing the polarity of the D.C. voltage which is enough to overcome the holding power of either magnet and transfer the armature to an opposite position. The coil is then de-energized.

9 Claims, 1 Drawing Sheet

MAGNETIC LATCHING SOLENOID

CONTRACTURAL ORIGIN OF THE INVENTION

The United States Government has rights in this invention pursuant to Contract No. DE-AC07-76ID01570 between the United States Department of Energy and EG&G Idaho, Inc.

TECHNICAL FIELD

This invention relates to a D.C. magnetic latching solenoid that retains a moving armature in a first or second position by means of a pair of magnets, thereby having a zero-power requirement after actuation.

BACKGROUND OF THE INVENTION

One example of the use of a solenoid is to operate a series of irrigation control valves. A typical prior art irrigation control valve uses a 24-volt, 60-Hz, 2-watt solenoid to actuate a diaphragm valve that opens or shuts the actual water valve. It is continuously energized to open the water valve.

Because there are so many of these valves in use in the West, it would be desirable to reduce the electrical power required to operate these agriculture irrigation control valves. This type of actuator is the two-position type, and it consumes no power in the "off" position and dissipates steady state power in the "on" position. In this application, the moving armature actuates the valve by enabling or disabling a hydraulic operation to position the valve. The armature connecting to an actuator covers or uncovers a bleed orifice that allows upstream water pressure to bleed through the build up pressure on a diaphragm that develops enough force to actuate the valve open. The magnetic force of the coil does not directly position the valve but applies virtually all of its force to stress the spring and move the armature. Tests on typical irrigational valves, the Rain Bird 100-DV revealed the following characteristics:

- power: 2 watts at 24 volts A.C. & 60 Hz
- pull-in force: 310 g.
- hold-in force energized: 420 g.
- hold-in force de-energized: 82 g.
- armature displacement: 1.2 mm
- coil resistance: 52 D.C. ohms at ambient temperature The steady state power consumption of a typical existing solenoid irrigation valve is about 2 watts in the "on" state. This does not seem significant; but, considering the vast amount of agriculture irrigation with the operation of many thousands of these valves, the total power consumption does become significant. Specifically, it would be preferred to use a magnetic latching solenoid in place of these valves.

SUMMARY OF THE INVENTION

It is the purpose of this invention to provide a magnetic latching D.C. solenoid operator for valves or other applications that only requires a short pulse of power to activate the actuator in one direction or in an opposite direction. The actuator and permeable armature are held in either direction by permanent magnets. Reversing the polarity of the applied D.C. voltage reverses the direction of armature motion.

The latching solenoid invention generally stated comprises:

- an electric coil;
- an iron armature within the coil;
- a pair of magnets in proximity to a first and second end of the armature, said magnets each having a like polarity adjacent the armature; and
- a polarity reversing switch connecting to the electric coil, wherein applying a voltage of a first polarity moves the armature to a first position and applying a reverse polarity voltage moves the armature to a second reverse position, and the armature is then retained in either position by one or the other of said magnets after the voltage is removed.

Other objects, advantages, and capabilities of the present invention will become more apparent as the description proceeds.

DETAILED DESCRIPTION OF THE INVENTION

A first magnetic latching solenoid was developed using a pair of coils each acting on a permeable magnetic armature. Armature motion in a first direction would occur when the first coil was energized with (+) voltage and the other coil was energized with a (−) voltage at 1/10th the value of the first voltage. The reverse armature condition is then obtained by reversing the applied voltages. The disadvantage here was the complicated mechanical linkages and somewhat complicated reversing electrical circuit.

Figure 1:
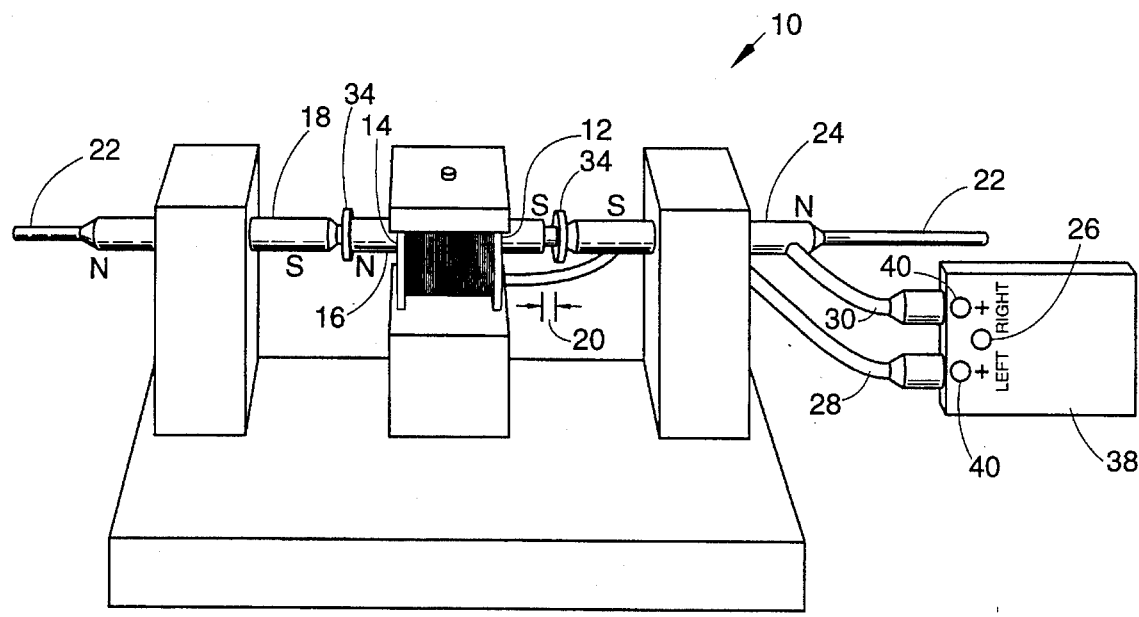
FIG. 1 is a front perspective view of a prototype model of the latching magnetic solenoid.
Figure 2:
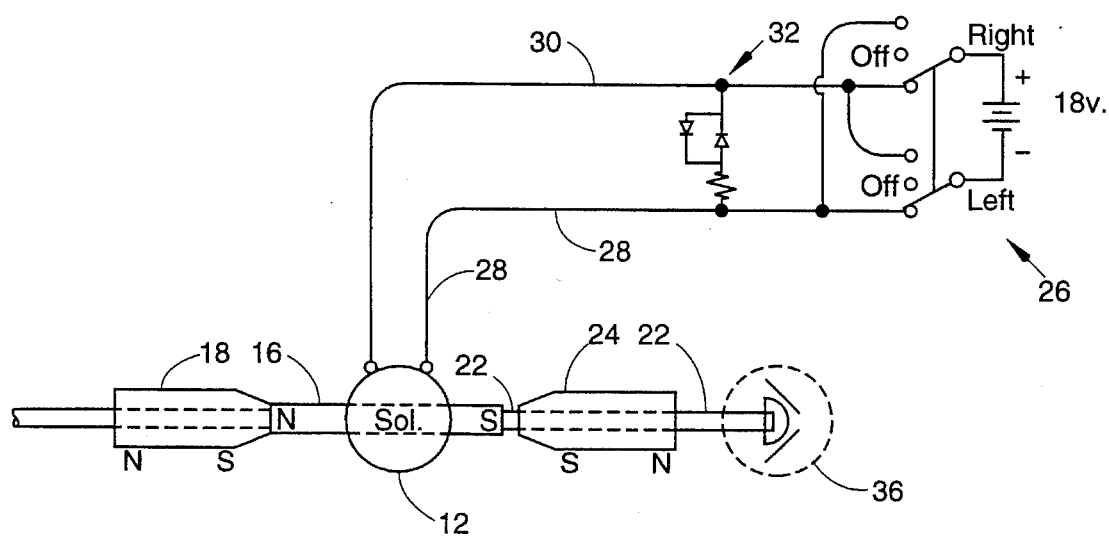
FIG. 2 is a schematic drawing of the latching magnetic solenoid and switching means.

A preferred embodiment is disclosed by referring to FIGS. 1 and 2. The latching magnetic solenoid 10 consists of an electric coil 12 having an aperture 14 through a center portion. Within the aperture 14 is a permeable iron or steel armature 16 that is free to travel left or right. In the left position, as shown, the armature 16 is close to a fixed first magnet 18 as evidenced by a gap 20 at the opposite end of armature 16. The armature 16 is fixed to a pair of movable non-magnetic rods 22 which pass through the center of fixed magnet 18 and second fixed magnet 24. The magnets as shown both have similar south (S) poles adjacent the armature 16. The actuator rod 22 and armature 16 have been moved to the left by energizing coil 12 with a first D.C. polarity creating a north (N) pole at the left end and a south (S) pole at the right end due to attraction (unlike poles) at the left and repulsion (like poles) at the right end, respectively.

FIG. 2 shows the poles and voltage switch means that accomplish this action. Double pole switch 26 reverses the polarity as in conductors 28 and 30 when switched to the "RIGHT" position. These polarities can be seen in FIG. 2 schematic which also shows the electrical switch and the EMF dissipation diodes and resistor network 32. In this prototype setup, the magnetic force on the armature was reduced by inserting plastic spacers 34 so that the electromagnetic field from coil 12 could overcome each of the permanent magnets 18 and 24. FIG. 2 also shows an attached phantom globe valve 36 that could be attached to the actuator 22.

EXPERIMENT

A laboratory test setup was performed using the configuration of FIGS. 1 and 2. Application of the 18 volts (from two 9 v transistor batteries) to the coil 12 caused about a 200 ma. current actuating the armature in each direction. In this D.C. application, the A.C. 2-watt solenoid coil 12, described in the Background, would require about a 2 watt-sec pulse to move the armature 16 and actuator 22.

Adjustment of the pull-in force and holding force can be accomplished basically by changing the coil or gap, varying the voltage or shim thickness or changing the magnetic strength, in order to upscale or downscale the required force and travel requirements. The control switch 26 in the above experiment includes a "left", "off", and "right" positions. This switch box 38 also has LED indicators 40 above the positions to indicate position where power is applied (FIG. 1), which would require a triple pole switch 26 (not shown in FIG. 2 for clarity). The switch can be labeled as needed, e.g., "forward", "off", and "reverse". An obvious improvement to the D.C. control circuit would be to add an electronic circuit that issues positive or negative current pulses to a system having many actuators.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A D.C. magnetic latching solenoid comprising:
   a. an electric coil;
   b. a movable iron armature within the coil, said armature having a longitudinal axis and first and second ends;
   c. first and second non-magnetic actuator rods attached respectively to the first and second ends of the armature on said longitudinal axis thereof, said rods passing through an aperture in first and second fixed magnets located proximate to the first and second ends of the armature, said magnets each having a like polarity adjacent the armature; and
   d. a coil polarity reversing means connecting to the electric coil, wherein applying a voltage of a first polarity moves the armature in linear motion along the longitudinal axis to a first position and applying a reverse polarity voltage moves the armature in linear motion along the longitudinal axis to a second opposite position, and the armature is then retained in either position by one or the other of said magnets after the voltage is removed.

2. The solenoid as recited in claim 1 wherein the actuator is slidably affixed to a valve orifice to open and close a valve.

3. The solenoid as recited in claim 2 wherein the switch means is a double-pole, double-throw switch having forward, off, and reverse positions.

4. The solenoid as recited in claim 2 wherein the switch means is a triple-pole, double-throw switch for activating the coil and energizing one of a pair of position-indicating lights.

5. A D.C. magentic latching solenoid comprising:
   a. an electric coil;
   b. a movable iron armature longitudinally aligned within the coil, said armature having first and second ends and a pair of non-magnetic actuators longitudinally aligned with said armature and fixed thereto;
   c. a pair of fixed magnets in linear proximity to the first and second ends of the armature located on a longitudinal axis of the armature, said magnets each having a like polarity adjacent the armature; and
   d. a coil polarity reversing means connecting to the electric coil, wherein applying a voltage of a first polarity moves the armature in linear motion to a first position and applying a reverse polarity voltage moves the armature in linear motion to a second opposite position, and the armature is then retained in either position by one or the other of the said magnets after the voltage is removed.

6. The solenoid as recited in claim 5 wherein the actuator rod passes through an aperture in each magnet.

7. The solenoid as recited in claim 6 wherein the actuator is slidably affixed to a valve orifice to open and close a valve.

8. The solenoid as recited in claim 7 wherein the switch is a double-pole, double-throw switch having forward, off, and reverse positions.

9. The solenoid as recited in claim 7 wherein the switch means is a triple-pole, double-throw switch for activating the coil and energizing one of a pair position-indicating lights.

* * * * *